United States Patent [19]

Candor

[11] 3,931,682
[45] Jan. 13, 1976

[54] LIQUID REMOVING METHOD AND APPARATUS

[76] Inventor: James T. Candor, 5440 Cynthia Lane, Dayton, Ohio 45429

[22] Filed: May 14, 1974

[21] Appl. No.: 469,820

[52] U.S. Cl. .................. 34/1; 34/164; 219/10.81
[51] Int. Cl.² ........................................ B01K 5/00
[58] Field of Search ............... 34/1, 164; 219/10.81; 68/19.1

[56] References Cited
UNITED STATES PATENTS

| | | | |
|---|---|---|---|
| 2,939,223 | 6/1960 | Smith | 34/152 |
| 3,543,408 | 12/1970 | Candor et al. | 34/1 |
| 3,641,680 | 2/1972 | Candor et al. | 34/1 |

*Primary Examiner*—Carroll B. Dority
*Assistant Examiner*—Larry I. Schwartz
*Attorney, Agent, or Firm*—Candor, Candor & Tassone

[57] ABSTRACT

Apparatus and method for removing moisture from moisture bearing material comprising supporting structure for supporting the material, a vibrator unit for vibrating the supported material and an electrostatic unit for electrostatically removing moisture from the vibrating material. The vibrator unit and the electrostatic unit are disposed in aligned relation substantially transverse to the supported material to respectively and substantially act in unison thereon.

20 Claims, 3 Drawing Figures

U.S. Patent   Jan. 13, 1976   3,931,682
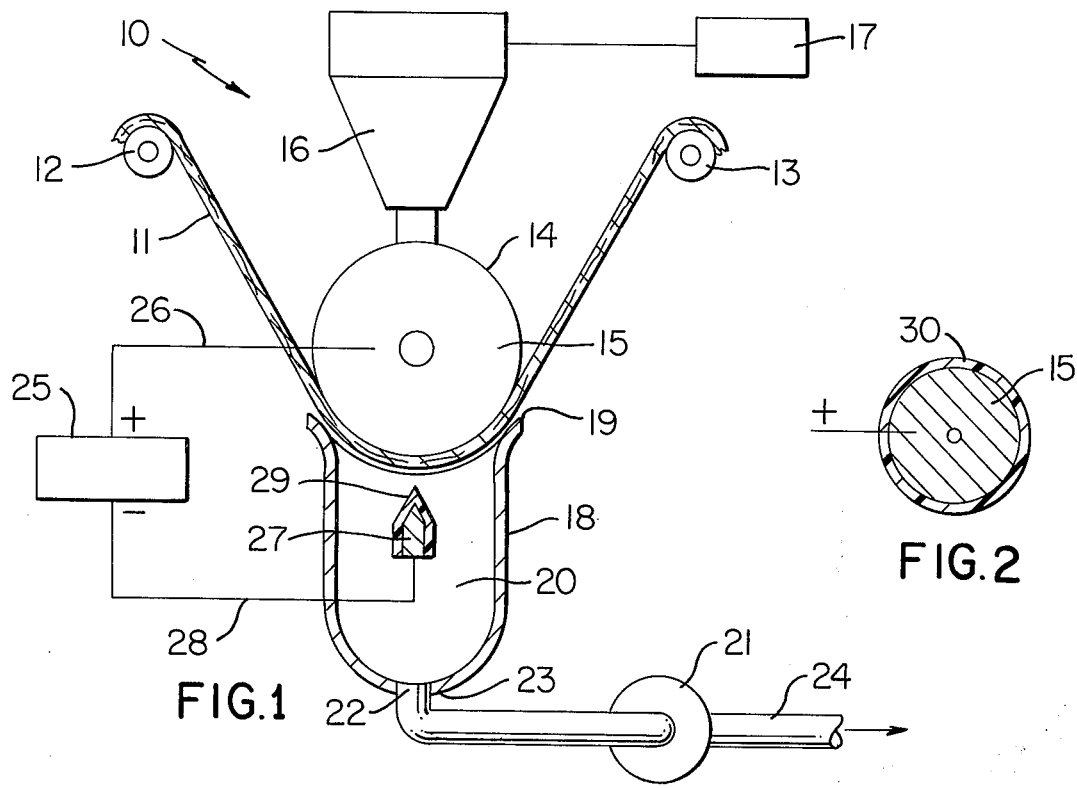
FIG.1
FIG.2
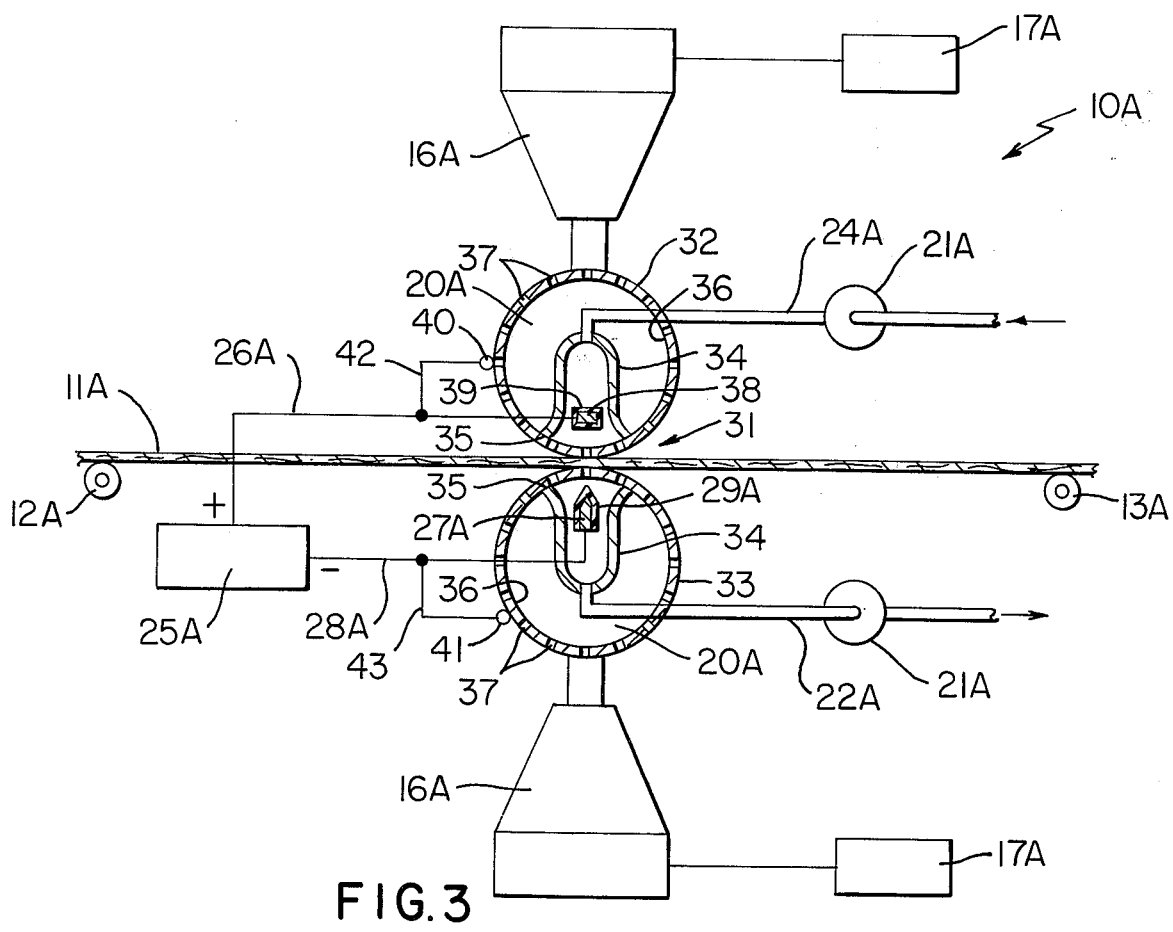
FIG.3

LIQUID REMOVING METHOD AND APPARATUS

This invention relates to an improved apparatus and method for removing moisture from moisture bearing material and the like.

It is well known from the patent to Candor et al., U.S. Pat. No. 3,641,680 that it has been suggested that the combination of vibrating action and electrostatic field action on the moisture of moisture bearing material will tend to remove such moisture from the moisture bearing material because it is believed that the vibrating action will tend to reduce the particle size of the mositure in the moisture bearing material to tend to reduce the capilliary holding action of the material on the moisture therein while the electrostatic field action will tend to sweep such reduced sized moisture particles from the moisture bearing material by an electro-osmotic action.

It is a feature of this invention to provide an apparatus and method whereby the vibrating action and electrostatic field action can act in substantial unison on the moisture bearing material to remove the moisture thereof for the above reasons.

In particular, one embodiment of this invention provides means for supporting the moistture bearing material, vibrating means for vibrating the supported material and electrostatic means for electrostatically removing moisture from the vibrating material, the vibrating means and electrostatic means being disposed in aligned relation substantially transverse to the supported material to respectively and substantially act in unison thereon.

Accordingly, it is an object of this invention to provide an improved apparatus for removing moisture from moisture bearing material, the apparatus of this invention having one or more of the novel features set forth above or hereinafter shown or described.

Another object of this invention is to provide an improved method for removing moisture from moisture bearing material, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a schematic view, partially in cross section, illustrating one embodiment of the method and apparatus of this invention.

FIG. 2 is a cross-sectional view of another embodiment of a vibrating roller for the apparatus and method of FIG. 1.

FIG. 3 is a view similar to FIG. 1 and illustrates another embodiment of the method and apparatus of this invention.

While the various features of this invention are hereinafter described and illustrated as being particularly adapted to remove moisture from a wet paper web, it is to be understood that the various features of this invention can be utilized singly or in any combination thereof to act on other types of moisture bearing materials as desired.

Therefore, this invention is not to be limited to not only the embodiments illustrated in the drawings, because the drawings are merely utilized to illustrate one of the wide variety of the uses of this invention.

Referring now to FIG. 1, the improved method and apparatus of this invention is generally indicated by the reference numeral 10 for acting on a wet web of material 11, such as a wet paper web as the same is being continuously formed in a paper making apparatus, a moist cloth material as the same is moving through a drying apparatus, etc., suitably supported by roller means 12 and 13 to pass from left to right in FIG. 1 by itself or with a supporting screen or porous belt so as to pass around part of an external periphery 14 of a cylindrical conductive roller 15 that is adapted to be vibrated sonically or ultrasconically by conventional vibrating apparatus 16 suitably interconnected thereto and being supplied energy from an energy source 17 in a conventional manner.

In this manner, as the web of material 11 passes into engagement with the outer periphery 14 of the roller 15, the vibrating roller 14 rotates therewith and imparts vibrating action to the web of material 11 to tend to act on the moisture therein in a manner believed to tend to reduce the holding force of the fibers of the material 11 on the moisture contained therein, such as by reducing the particle size of the moisture contained in the material 11 through the vibration of such particles against the fibers of the web 11.

A stationary suction nozzle 18 is carried by the apparatus 10 and has an open end 19 disposed closely adjacent the roller 15 on the other side of the web 11 to tend to draw moisture from the material 11 into the interior 20 of the nozzle means 18 by a suction device 21 having an inlet conduit 22 thereof interconnected to the cavity 20 of the nozzle 18 at the bottom wall 23 of the nozzle 18 to tend to force moisture collected into the nozzle 18 out of an outlet conduit 24 of the suction means 21 for recovery purposes or exhaust thereof as the case may be.

In addition, an electrostatic field generating source means 25 is provided for the apparatus 10 and is adapted to charge the conductive roller 15 with a positive charge through a suitable lead means 26 while being adapted to charge a pointed, serrated or other desired shaped conductive electrode 27 with a negative charge through a suitable lead means 28, the electrode 27 being disposed in the cavity 20 of the nozzle 18 and pointing toward the roller 15 so as to create an electrostatic field action with the roller 15 whereby such electrostatic field tends to pass through the web of material 11 as the web 11 passes between the roller 15 and nozzle 18.

If desired, the electrode 27 can be covered with suitable insulating material 29 to prevent shorting thereof by the moisture being drawn into the inlet end 19 of the nozzle 18 or can be non-insulated and be a roller disposed in contact with the underside of the web 11 to impart its charge to the web 11.

Similarly, the roller 15 of the vibrating apparatus 16 can have its outer periphery covered with insulating material, such as the insulating material 30 illustrated in FIG. 2 while the interior of the roller is conductive and is provided with the positive charge from the source 25 by the lead 26.

In any event, it can be seen that the method and apparatus 10 of this invention has the vibrating means 15 and electrostatic means 27 disposed in aligned relation transverse to the material 11 to operate thereon in substantial unison in a manner now to be described.

As the web of material 11 continuously passes from left to right in FIG. 1 through the apparatus 10 by suitable drive means (not shown), a portion of the web of material 1 is always disposed in contact with a portion of the outer periphery 14 of the vibrating roller 15 whereby the vibrating roller 15 is believed to impart vibrating action to the engaged material 11 to tend to reduce the particle size of the moisture being contained therein and such reduced sized vibrating particles are believed to be adapted to be swept therefrom by the electrostatic field action created between the positively charged roller 15 and the negatively charged electrode 27 for the reasons set forth in the aforementioned patent to Candor et al., U.S. Pat. No. 3,641,680 and/or any of the Candor et al-patents referred to therein.

In addition, a fluid flow is created in a direction toward the electrode 27 by the suction device 21 with such fluid flow passing through the material 11 to also tend to sweep such vibrating moisture particles therein into the cavity 20 of the nozzle 18 to be swept away by the sucting device 21 out through the outlet conduit 24 whereby the fluid flow being created by the suction means 21 is also disposed transverse to the material 11 and in alignment with the vibrating means 15 and electrostatic means 27.

Thus, as each section of the material 11 passes against the roller 15, the same has the combined action of the vibrating means 15 and electrostatic field of electrode means 27, as well as the fluid flow action of the suction means 21, imposed thereon substantially simultaneously and in a direction transverse thereto to tend to sweep the moisture from that particular section of the material 11.

Accordingly, it is believed that the method and apparatus 10 of FIG. 1 will tend to remove moisture from the moisture bearing material 11 as the same passes between the roller 15 and nozzle 18 for the reasons previously set forth.

Another method and apparatus of this invention is generally indicated by the reference numeral 10A in FIG. 3 and parts thereof similar to the apparatus and method 10 previously described are indicated by like reference numerals followed by the reference letter "A".

As illustrated in FIG. 3, the moisture bearing material 11A is supported by roller means 12A and 13A to pass from left to right in FIG. 3 through the apparatus 10A and is adapted to pass through a nip area 31 formed between a pair of perforated cylindrical rollers 32 and 33 respectively being adapted to be vibrated sonically or ultrasonically by vibrating apparatus 16A respectively interconnected thereto and interconnected to power source means 17A in a conventional manner whereby the rollers 32 and 33 are adapted to rotate as the material 11A passes therethrough and will impart vibrating action to the material 11A in the same manner as the roller 15 previously described.

However, each roller 32 and 33 has a stationary nozzle 34 disposed therein with the open end 35 of the respective nozzle 34 facing toward the material 11A and being disposed against the internal peripheral surface 26 of the respective roller 32 or 33 to be in fluid communication with perforations 37 passing through the respective roller 32 or 33 in the area of the moisture bearing material 11A passing through the nip area 31 thereof as illustrated.

Each nozzle 34 is interconnected to a suction device 21A except that the nozzle 34 for the upper roller 32 is interconnected to the outlet conduit 24A of its suction device 21A while the nozzle 34 of the lower roller 33 is interconnected to the inlet conduit 22A of its suction device 21A whereby fluid under pressure is adapted to be forced out of the nozzle means 34 of the upper roller 32 and into the material 11A at the open end 35 of its nozzle 34 while such fluid is adapted to be drawn into the open end 35 of the nozzle 34 of the lower roller 33 to thereby create a fluid flow directly through the material 11A in aligned relation with the vibrating rollers 32 and 33.

A voltage source 25A is provided for the apparatus and method 10A and is adapted to place a positive charge on an electrode 38 disposed in the chamber 20A of the upper nozzle 34 through a lead means 26A and place a negative charge on the electrode 27A disposed in the chamber 20A of the lower nozzle 34 by the lead means 28A, the upper electrode 38 and lower electrode 27A being respectively covered by insulating material 39 and 29A if desired and being of any desired shape for the intended function thereof.

Alternately or in addition to the electrodes 38 and 27A, the rollers 32 and 33 can be formed by conductive material and be respectively provided with a positive and negative charge through rolling contact means 40 and 41 respectively disposed in contact with the roller 32 and 33 and being interconnected to the leads 26A and 28A by branch leads 42 and 43.

In this manner, an electrostatic field action will be formed transverse to material 11A between the rollers 32 and 33 either by the electrostatic field action being created between the electrodes 38 and 27A and/or by the electrostatic field action being created between the charged rollers 32 and 33 by the rolling contacts 40 and 41.

In any event, it can be seen that the apparatus and method 10A, in a manner similar to the apparatus 10, and method, has the vibrating means 32, 33; electrode means 38, 27A and/or 32, 33 and fluid moving means 34 of the rollers 32 and 33 disposed in aligned relation substantially transverse to the material 11A to operate in substantial unison thereon in a manner now to be described.

As the material 11A continuously passes from left to right in the apparatus and method 10A of FIG. 3, the vibrating rollers 32 and 33 act thereon to impart vibrating action to the section of material 11A disposed in the nip area 31 and engaging the rollers 32 and 33 whereby the vibrating material 11A is believed to cause the moisture particles therein to tend to be reduced in size and thereby have the force of the capillary holding action of the material 11A thereon reduced. The electrostatic field action being produced between the electrodes 38 and 27A and/or between the charged rollers 32 and 33 acts on such vibrating moisture particles to tend to sweep the same from the material 11A into the opening 35 of the lower nozzle 34 to be swept away from the interior 20A of the lower nozzle 34 through the lower suction device 21A. In addition, the fluid flow being created between the upper and lower nozzle means 34 of the rollers 32 and 33 in a direction down through the material 11A into the lower nozzle 34 also tends to sweep the vibrating moisture particles of the moisture bearing material 11A therefrom into the lower nozzle 34 to be removed therefrom by the suction device 21A in the manner previously described.

Therefore, it is believed that the method and apparatus 10A will tend to remove moisture from the moisture bearing material 11A as the same passes from left to right in the apparatus and method 10A through the combined action of the vibrating rollers 32, 33 and the electrostatic field produced by the electrodes 38, 27A and/or charged rollers 32 and 33 as well as by the fluid flow passing from the upper nozzle 34 with such actions all being transverse to the material 11A and in substantial aligned relation relative to each other while acting in unison on the material 11A.

While the electrostatic means of this invention has been described and illustrated as operating between oppositely charged electrodes, it is to be understood that such electrostatic field action can be created by a single electrode or between a pair of electrodes of which one thereof is grounded or at a like potential relative to another electrode but having a lesser positive or negative charge thereon as the case may be.

Also, the polarity of the electrodes illustrated in the drawings could be reversed, if desired.

While the vibrating means 15, 32 and 33 have each been illustrated and described as being a contact imparting vibrating means, it is to be understood that the vibrating means of this invention could comprise vibration means that impart sound waves against the web of material, whether said sound waves are audible or inaudible in much the same manner as set forth in the patent to Rodwin et al., U.S. Pat. No. 3,694,926, as it is believed that the electrostatic means, as well as the fluid directing means previously described, could be utilized in combination with such sound generating means.

Also, while an upper and lower roller means 32 and 33 are illustrated and described as jointly acting on the traveling web 11A, it is to be understood that the upper roller 32 and its associated structure could be eliminated whereby only the lower roller means 33 and its associated structure would be provided for acting on the material 11A to vibrate the same, create a fluid flow through the material 11A and to create an electrostatic field action on the material 11A whereby it can be seen that all three actions would all be disposed on the same side of the material 11A while being in alignment with each other and disposed substantially transversely to the material 11A. Of course, such lower roller means 33 when being utilized without the roller 32 and its associated structure could become an upper roller rather than a lower roller if desired. Also, when both rollers 32 and 33 are utilized, the same could be reversed so that roller 33 is an upper roller and roller 32 is a lower roller.

It is to be understood that while the rollers 32 and 33 are illustrated as merely contacting the web 11A in a non-compressing manner as the same passes through the nip area 31 thereof, the rollers 32 and 33 could also compress the web 11A as it passes therebetween to aid in the moisture removal from the web 11A in a manner similar to a press section of a conventional paper making machine.

Also, if only the roller 33 is utilized in the manner previously described, it is to be understood that the web 11A could pass around part of the same in the same manner as illustrated in FIG. 1 for the web 11 in order to increase the contact area between the roller 33 and the web 11A in a manner similar to a suction roll of a conventional paper making machine.

Therefore, it can be seen that this invention not only provides an improved apparatus for removing moisture from moisture bearing material, but also this invention provides an improved method of removing moisture from moisture bearing material.

While the form and method of this invention now preferred has been decribed and illustrated as required by the Patent Statute, it is to be understood that other forms and method steps can be utilized and still come within the scope of the appended claims.

What is claimed is:

1. Apparatus for removing moisture from moisture bearing material comprising means for supporting said material, vibrating means for vibrating said supported material, and electrostatic means for electrostatically removing moisture from said vibrating material, said vibrating means and said electrostatic means being in aligned relation substantially transverse to said supported material to respectively and substantially act in unison thereon, said vibrating means including part of said electrostatic means.

2. Apparatus as set forth in claim 1 wherein said vibrating means and the remainder of said electrostatic means are respectively disposed on opposite sides of said supported material.

3. Apparatus as set forth in claim 1 wherein fluid directing means is provided for directing fluid through said supported material and is in aligned relation with said vibrating means and said electrostatic means.

4. Apparatus as set forth in claim 1 wherein said vibrating means comprises vibrating roller means disposed against said material to impart vibrating action thereto.

5. Apparatus as set forth in claim 1 wherein said electrostatic means comprises electrode means disposed on opposite sides of said supported material to provide an electrostatic field therebetween and acting through said supported material, one of said electrode means being said part of said electrostatic means.

6. A method for removing moisture from moisture bearing material comprising the steps of supporting said material, vibrating said supported material with vibrating means, electrostatically removing moisture from said vibrating material with electrostatic means, forming said vibrating means to include part of said electrostatic means, and disposing said vibrating means and said electrostatic means so as to be in aligned relation substantially transverse to said supported material to respectively and substantially act in unison thereon.

7. A method as set forth in claim 6 and including the step of disposing said vibrating means and the remainder of said electrostatic means so as to be respectively disposed on opposite sides of said supported material.

8. A method as set forth in claim 6 and including the step of directing fluid through said supported material with fluid directing means that is disposed in aligned relation with said vibrating means and said electrostatic means.

9. A method as set forth in claim 6 and including the step of forming said vibrating means from a vibrating roller means, and disposing said roller means against said material to impart vibrating action thereto.

10. A method as set forth in claim 6 and including the steps of forming said electrostatic means from electrode means, and disposing said electrode means on opposite sides of said supported material to provide an electrostatic field therebetween and acting through said supported material, one of said electrode means being said part of said electrostatic means.

11. Apparatus as set forth in claim 4 wherein at least part of said roller is formed of electrically conductive material that provides one electrode means of said electrostatic means and is thereby said part of said electrostatic means.

12. Apparatus as set forth in claim 11 wherein said roller has an outer electrically insulating cover covering said conductive part of said roller.

13. Apparatus as set forth in claim 11 wherein said electrostatic means comprises another electrode means disposed on the side of said supported material opposite to the side thereof where said roller is disposed.

14. Apparatus as set forth in claim 4 wherein said roller is hollow, said part of said electrostatic means comprising an electrode means disposed inside said roller.

15. Apparatus as set forth in claim 14 wherein said electrostatic means comprises another electrode means disposed on the side of said supported material opposite to the side thereof where said roller is disposed.

16. A method as set forth in claim 9 and including the step of forming at least part of said roller of electrically conductive material that provides one electrode means of said electrostatic means and is thereby said part of said electrostatic means.

17. A method as set forth in claim 16 and including the step of covering said conductive part of said roller with an outer electrically insulating cover.

18. A method as set forth in claim 16 and including the steps of forming said electrostatic means with another electrode means and disposing said other electrode means on the side of said supported material opposite to the side thereof where said roller is disposed.

19. A method as set forth in claim 9 and including the steps of making said roller hollow, forming said part of said electrostatic means from an electrode means, and disposing said electrode means inside said roller.

20. A method as set forth in claim 19 and including the steps of forming said electrostatic means with another electrode means, and disposing said other electrode means on the side of said supported material opposite to the side thereof where said roller is disposed.

* * * * *